June 2, 1953      S. J. ERLING      2,640,218
APPARATUS FOR OPERATING A VACUUM CURRYING APPARATUS
Filed Dec. 8, 1945      2 Sheets-Sheet 1
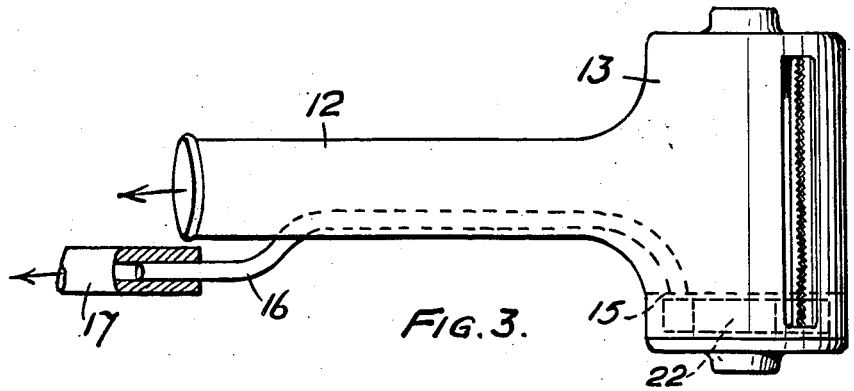
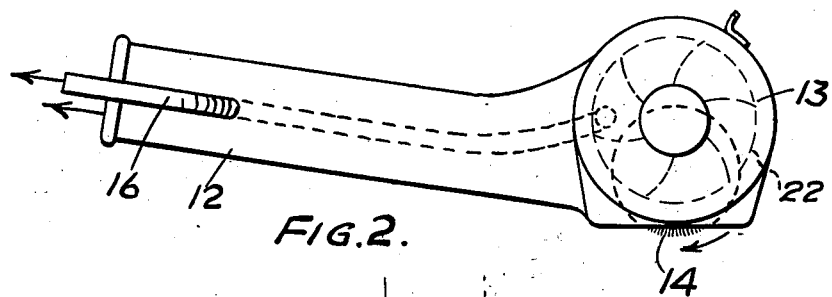
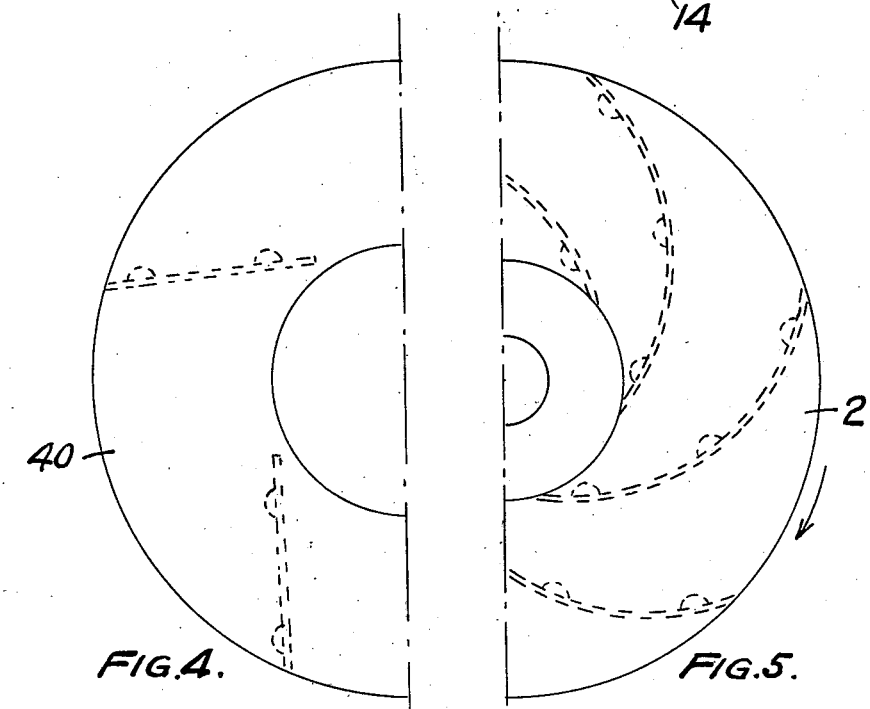
WITNESS:
INVENTOR
Sven Johan Erling
BY Busser & Harding,
ATTORNEYS.

Patented June 2, 1953

2,640,218

UNITED STATES PATENT OFFICE 2,640,218

APPARATUS FOR OPERATING A VACUUM CURRYING APPARATUS

Sven Johan Erling, Nockeby, Sweden, assignor to Aktiebolaget Separator, Stockholm, Sweden, a corporation of Sweden Application December 8, 1945, Serial No. 633,653
In Sweden December 15, 1944

4 Claims. (Cl. 15—327)

This invention relates to an improvement in power driven currying devices, and more particularly to a device for currying cows on a dairy farm provided with milking machines.

Currying machines for removing dirt particles from the fell of an animal are known, such apparatus comprising a suction nozzle, with or without moving parts for loosening dirt particles, together with suction means for conducting the dirt to a receptacle, as is done in household vacuum cleaners, driven by electric motors.

One of the objects of my invention is the provision of means whereby the apparatus is driven by pneumatic power, whereby all electrical connections and wiring to the apparatus are dispensed with.

Another object of my invention is the provision of means whereby the power can be drawn from the vacuum system used for operating milking machines, so that the operator can attach the hose for supplying the power to the currying machine to the pipe system for the milking machines.

Another object of my invention is the provision of a currying machine which will be light in weight as well as compact, so that the operator can carry the same on his back, whereby the operator is enabled to move from station to station, so that all that is necessary for him to do is to connect the hose leading to power devices of the currying machine to the connector on the vacuum pipe line for a milking machine.

Another object of my invention is to utilize the high suction and small volume of air drawn through the pipe system by the vacuum pump associated therewith, to draw a large volume of air through the currying nozzle and through the receptacle for receiving the dirt, while passing a relatively small amount of air to the vacuum system for the milking machines.

Referring to the accompanying drawings, illustrating one form of apparatus in accordance with my invention:

Fig. 2 is a side elevation of a currying nozzle,

Fig. 3 is a plan view of the nozzle shown in Fig. 2.

Fig. 4 is a plan view of a portion of one of the stationary air redirecting means; and Fig. 5 is a plan view of a portion of one of the fans.

Figure 1:
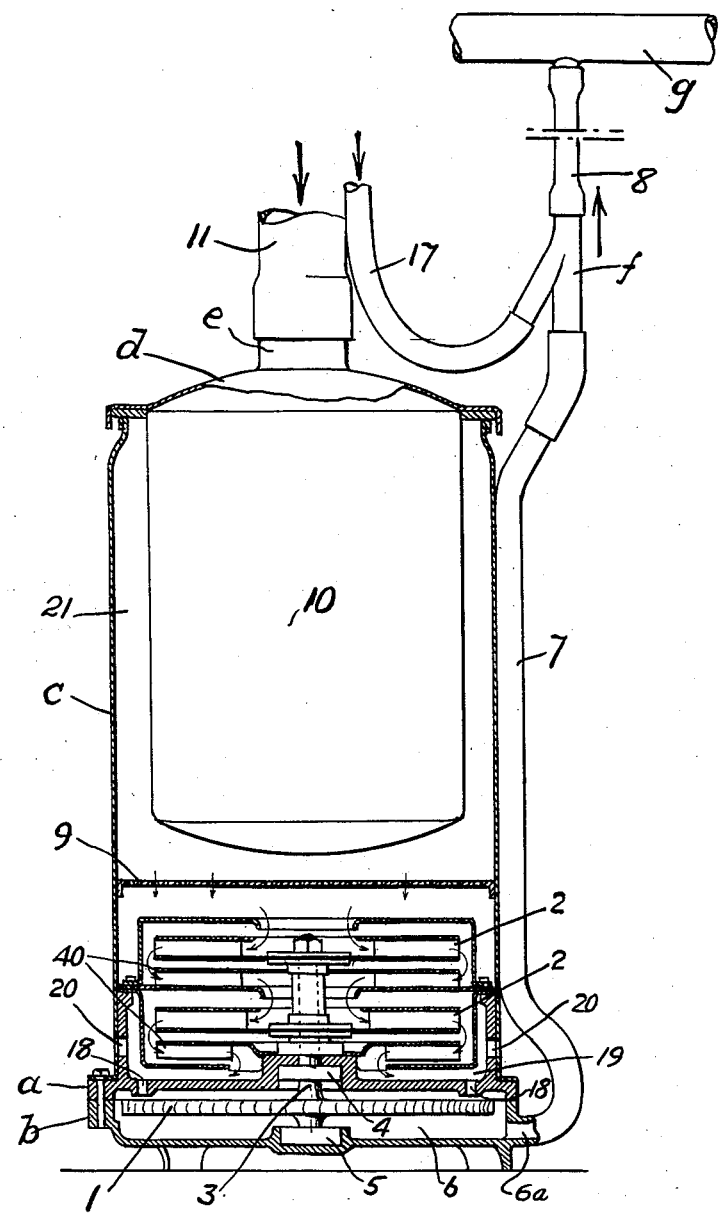
Fig. 1 is a longitudinal section of a pneumatic power transformer, in which parts are shown in outline.

The apparatus comprises a base portion formed of upper and lower members $a$ and $b$, respectively, which are connected to each other to form a substantially airtight operating chamber 6, except for the openings hereinafter mentioned.

Rotatably mounted in ball bearings in shells 4 and 5 mounted in recesses in the upper and lower casing members $a$ and $b$, respectively, is a shaft 3, which extends through the upper member $a$ of the casing.

Mounted on the shaft 3, within the operating chamber 6 formed between the members $a$ and $b$, is a pneumatically operable actuating device, here shown in the form of a turbine wheel 1, and secured to the shaft 3 above the member $a$ are two fans 2, 2, connected in series, with stationary air redirecting devices 40, which together form exhaust means for exhausting the air from the nozzle, as hereinafter described.

Supported on the member $a$ is a shell $c$, having a cover $d$, forming a filter chamber 21 within which is supported a bag 10 of the usual type for receiving the dust, etc., from a suction nozzle, by way of a flexible delivery tube 11, one end of which is connected to a tubular extension $e$ on the cover $d$ and to which the mouth of the bag 10 is also connected. The other end of the flexible delivery tube 11 is connected to the end of a metallic tube 12, extending from the housing 13 of the nozzle, and 14 designates a brush in the nozzle housing, a portion only of which is shown in full lines extending from the mouth of the nozzle, the outer diameter of the brush within the housing being shown in dotted lines.

The brush 14 may be driven by means of a turbine 22 located in a casing 15 shown in dotted lines, and may be driven direct or through reducing gears.

Connected to the outlet port $6a$ of operating chamber 6 is a tube 7 which is connected to a Y coupling $f$, to which is also connected a tube 8 which is adapted for connection to the socket connection of the milking machine vacuum line $g$.

Above the chamber 6 in the base is an exhaust chamber 19, which is provided with a plurality of small jet openings or ports 18 for delivering air at substantially atmospheric pressure to the blades of the turbine 1, and 20 are ports leading from chamber 19 to the atmosphere. Thus, the chambers 6 and 19 both communicate with atmosphere through the ports 20, the ports 18 serving as inlets to chamber 6 for admitting air at substantially atmospheric pressure.

Located within the shell $c$ below the dust bag 10 is a perforated partition 9.

A metallic tube 16 is located within the nozzle 12. The end within the nozzle housing is in communication with the outlet from a brush driving turbine 22, while the other end of the tube 16 is connected to one end of a flexible tube 17 connected at the other end to the Y coupling f.

When the tube 8 is connected to the high vacuum line g, such as used in a milking machine system, a relatively small volume of air at a pressure considerably below atmospheric pressure will be drawn through the turbines to operate the brush within the nozzle, and to rotate the exhaust fans 2, 2 to suck air through the nozzle opening and convey the dirt therewith through tubes 12 and 11 into the bag 10, the air passing through the bag in the well known manner, then through the perforated partition to chamber 19 and through openings 20 to the atmosphere.

As the pressure in chamber 19 is considerably higher than the pressure in chamber 6, and the jets of air delivered to the turbine are fine, the turbine will be rotated with sufficient power to operate the exhaust fans to pass a sufficient volume of air at a sufficient speed to carry the dirt to the bag 10, without delivering a large amount of air to the pump connected to the vacuum line. More particularly, an operating condition will result in which the flow through the ports 20 is directed outwardly. It is true that in starting the apparatus the air current is directed inwardly through ports 20 because the fan 2 starts from "rest" and therefore has no pumping action initially. However, when the turbine wheel 1 and the fan 2 have been brought up to speed, the fan will force large quantities of air through the tube 11, the filter 10, and out through the ports 20. This is necessarily so because the paths of flow through the fan 2 are much larger in cross-section than the paths of flow through the nozzles 18, so that the resistance to flow through the fan is correspondingly smaller. Assuming that the conduit 7 is connected to the vacuum system of a milking machine, a vacuum of about ½ atmosphere will normally be maintained in the conduit 7. The pressure differential between the ports 20 and the conduits 7, and consequently the drop of pressure across the openings 18, will be about ½ atmosphere. The turbine wheel 1 is rotated by the air jets from ports 18 with a force which depends upon the quantity of air multiplied by the pressure differential. This force represents work which is transmitted to the fan 2, which is thus capable of forcing the air through the tube 11 with a force commensurate with that generated by the turbine wheel. With the small pressure differentials utilized in operating a currying apparatus, the amount of air propelled by the fan 2 will necessarily be large (that is, as much as 10 times the quantity of air being sucked through the openings 18 when the fan 2 produces a pressure differential of the order of ½0 atmosphere). Consequently, not only does the air flow outwardly through the ports 20, but the quantity of air passing through these ports is many times larger than that passing through the nozzles 18 into the operating chamber 6.

The advantages of applicant's invention result from the provision of means for providing sufficient suction and a sufficient volume of air for conducting the dirt from a nozzle of a currying machine, which means are operated by a vacuum system having a high vacuum and through which the volume of air which is passed would be insufficient to conduct the dirt.

It will be evident that numerous variations may be made in apparatus for operating an animal currying device from a vacuum system without departing from the principles of the invention as defined in the claims.

What I claim and desire to protect by Letters Patent is:

1. In a pneumatic currying apparatus, a portable casing for connection to a suction currying nozzle and divided into an operating chamber, an exhaust chamber, and a filter chamber having an air suction inlet, an air filter in the filter chamber interposed between the suction inlet and said exhaust chamber, the filter chamber communicating with the exhaust chamber and the exhaust chamber communicating with atmosphere, a fan in the exhaust chamber for drawing air from the suction inlet through the air filter and discharging the same from the exhaust chamber, a pneumatically operable actuating device mounted in said operating chamber, a positive driving connection between said actuating device and the fan for driving the same, the fan being adapted to draw a relatively large volume of air at a pressure somewhat below atmosphere while said actuating device is operable by a relatively small volume of air undergoing a relatively large change in pressure in passing therethrough, the operating chamber having an inlet port and an outlet port, and a flexible hose for connecting one of said ports to a pneumatic pipe line to operate the actuating device by air flow from said inlet port through the operating chamber to the outlet port.

2. A pneumatic currying apparatus as defined in claim 1, comprising also a suction currying nozzle connected to said suction inlet, a pneumatically operable actuating device mounted in the suction nozzle, a brush in the suction nozzle rotatable by said last device, and a flexible hose leading from said first hose to the suction nozzle to operate said last device pneumatically by the air pressure differential between the nozzle and said pneumatic pipe line.

3. A pneumatic currying apparatus as defined in claim 1, in which the exhaust chamber communicates with atmosphere through an opening for discharging the air drawn by the fan, said actuating device being a turbine wheel, the exhaust chamber also communicating with the operating chamber through said inlet port for directing an air jet upon the turbine wheel.

4. In a pneumatic currying apparatus, a portable casing for connection to a suction currying nozzle, the casing having an exhaust chamber provided with an inlet for admitting air from the nozzle and also provided with an outlet opening, the casing also having an operating chamber and a partition between said chambers, a rotatable shaft extending through the partition and into said chambers, a fan on the shaft in the exhaust chamber and rotatable with the shaft to draw air through said inlet, stationary air vanes mounted in the exhaust chamber between the fan and said outlet opening for guiding the air to the outlet opening, the exhaust chamber also having a main discharge port to atmosphere for exhausting air drawn by the fan blades, a turbine wheel mounted on the shaft in the operating chamber, said outlet opening being located in the partition in position to direct an air jet from the exhaust chamber upon the turbine wheel to rotate the wheel and the fan, the fan being adapted to draw a relatively large volume of air at a pressure somewhat below atmosphere while the turbine wheel is operable by a relatively small volume of air undergoing a relatively large change in pressure in passing therethrough, and means for exhausting air from the operating chamber, whereby the pressure in the operating chamber is less than the pressure in the exhaust chamber.

SVEN JOHAN ERLING.

References Cited in the file of this patent

UNITED STATES PATENTS

| Number | Name | Date |
|---|---|---|
| 908,991 | Hammer | Jan. 5, 1909 |
| 938,988 | Foster | Feb. 14, 1911 |
| 1,021,667 | Duffie | Mar. 26, 1912 |
| 2,121,754 | Cornell | June 21, 1938 |
| 2,272,037 | Horton | Feb. 3, 1942 |
| 2,331,692 | Hunt | Oct. 12, 1943 |

FOREIGN PATENTS

| Number | Country | Date |
|---|---|---|
| 54,151 | Denmark | Jan. 10, 1938 |